Figure 1:
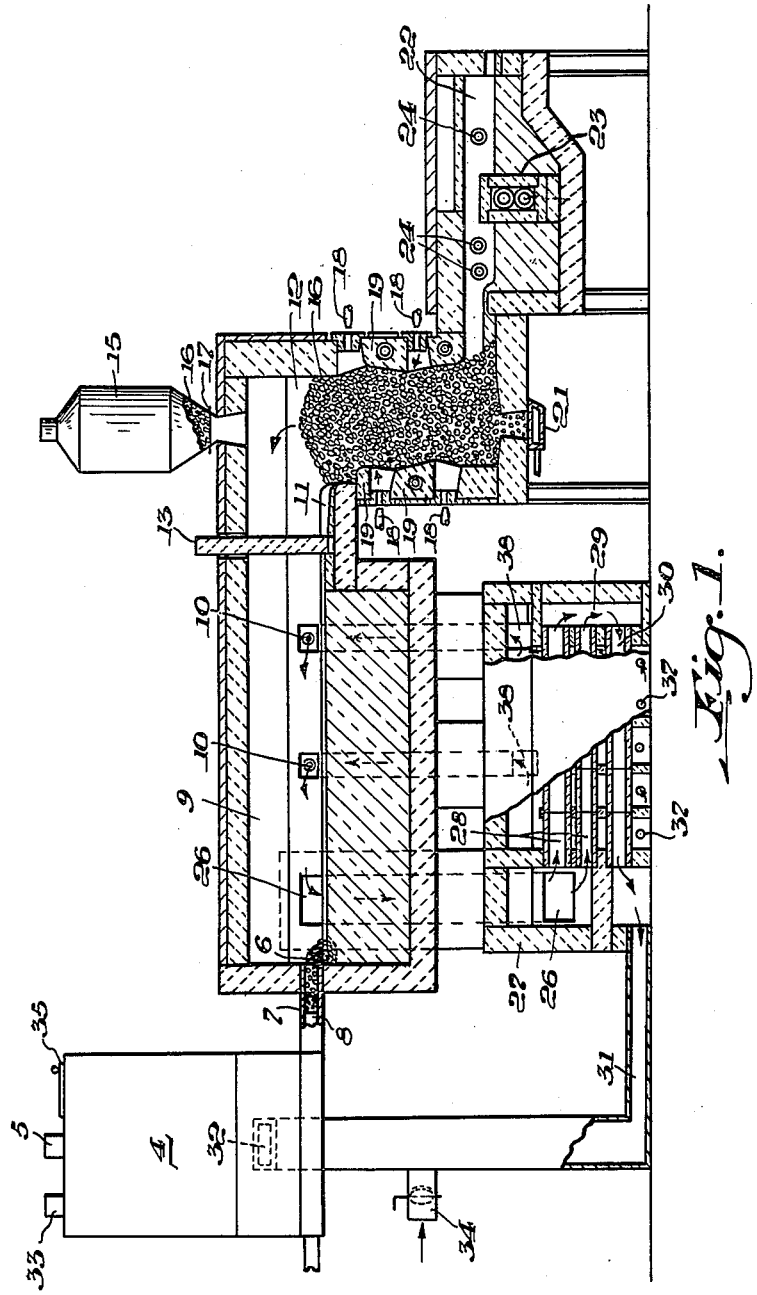

May 20, 1952

G. E. HOWARD 2,597,640

GLASS MELTING METHOD

Filed Oct. 17, 1950

2 SHEETS—SHEET 1

INVENTOR.
GEORGE E. HOWARD.
BY Archworth Martin
his ATTORNEY.

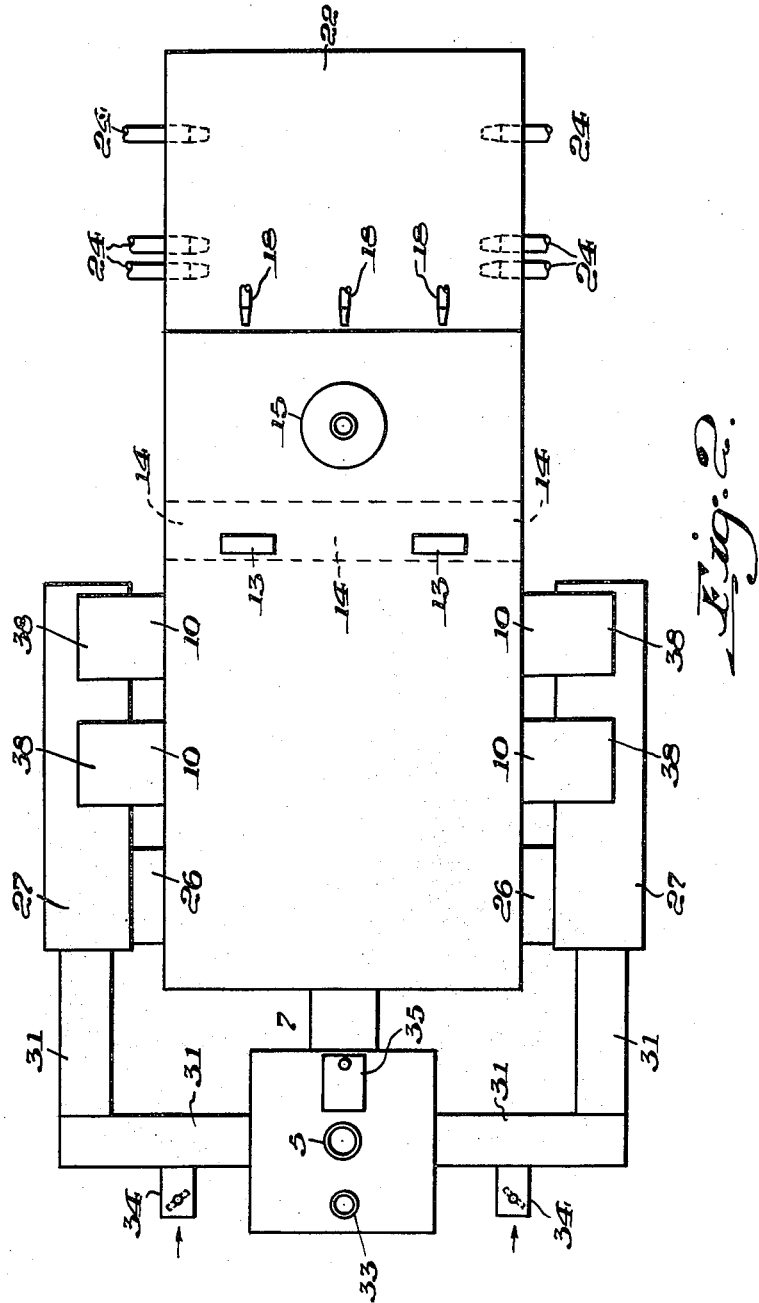

Patented May 20, 1952

2,597,640

UNITED STATES PATENT OFFICE 2,597,640

GLASS MELTING METHOD

George E. Howard, Butler, Pa.

Application October 17, 1950, Serial No. 190,489

6 Claims. (Cl. 49—77)

This invention relates to a method for the melting of glass batches, and constitutes an improvement on the inventions disclosed in my application Serial No. 57,935, filed November 2, 1948 (Patent 2,564,783) and Serial No. 102,505, filed July 1, 1949, the principal point of distinction in the present case over the said applications being in the forming of the glass batch in the shape of briquettes and melting the same before feeding it into the shaft or stack that contains highly refractory lumps.

One object of my invention is to provide improved control of glass-melting operations, through preheating of the briquettes as one step, fritting and melting the same, as a second step of the operation, and plaining or refining the molten batch by passing it through a body of refractory lumps that are in the form of a filter bed, as a third step in the operation.

Another object of my invention is to secure better plaining and refining of the molten batch than is possible by methods heretofore employed.

Still another object of my invention is to provide an improved method for economizing on fuel, particularly through the use of waste fuel to preheat the briquettes, and through a method which reduces the usual percentage of heat loss through radiation in the melting system.

A furnace for carrying out my invention is shown in the accompanying drawings, wherein Figure 1 is a view partly in side elevation and partly in longitudinal section, and Fig. 2 is a schematic plan view thereof.

The apparatus for carrying out the method comprises a chamber or hopper 4 into which briquettes can be fed through a spout or inlet pipe 5. These briquettes will contain the usual glass batch materials such as lime, soda, silica, and perhaps some alumina, these lumps being suitably of one or two inches in diameter. The briquettes 6 pass by gravity from the hopper into a feed pipe 7, wherein a plunger 8 is reciprocated in any suitable manner to push them into a preliminary melting furnace 9, the plunger 8 being shown in its foremost position. The briquettes will be preliminarily heated to about 900° F. to 1000° F. as hereinafter explained.

The furnace 9 has the usual burners 10 at suitable intervals along its sides, to heat the furnace chamber to about 2000° F. or above. The molten batch will flow along troughs 11 into a stack or shaft 12. Gates 13 control flow from the pool of glass in the chamber 9, the pool being preferably maintained at a slightly higher lever than the flow opening beneath the gate 13, so as to maintain a sufficiently high level that there will be a reserve or reservoir of glass for continued supply to the refining chamber and the forehearth in case there is interruption in the supply of briquettes. The gates 13 are of no greater width than the troughs 11 so that passageways or spaces 14 are present at the vertical edges of the gates, to permit flow of heating gases from the shaft 12 into the chamber 9, and thereby utilize the gases which would otherwise be simply wasted from the said shaft. The temperature of the gases in the upper portion of shaft 12 may suitably be in the neighborhood of 2400° F.

A chamber 15 discharges refractory lumps 16 into the stack 12, the discharge being controlled by a gate or valve 17. These lumps may suitably be of roughly two inches to four inches in diameter, so as not to greatly restrict upward flow of heating gases through the bed of lumps in the shaft, and also to permit sufficiently free flow of the molten batch to the bottom of the shaft.

Refractory lumps suitable for this purpose may be of dense silica or highly aluminous material, platinum, or the like, with a higher melting point than the liquifying temperature of the batch. These lumps are preferably of a material that will not soften at temperatures below 2600° F., which is much above the liquifying point of the briquettes. Refractory materials of the character commonly found in melting-tank walls and which erode very slowly, will usually be employed.

Burners for heating the interior of the shaft are provided at 18 and may be distributed along the sides of the shaft as in my second-named application. Also, baffle members 19 serve to obstruct free downward movement of the lumps 16 to prevent compacting of the material in the stack and therefore allowing for freer movement of the gases and the molten glass, as well as preventing obstruction at the burner openings.

The lumps 16 will gradually be eroded and taken into solution by the down-flowing glass from the tank 9, so that they are gradually reduced in size as they approach the bottom of the stack. In order to prevent accumulation of too many small lumps of perhaps one inch or less in diameter that would obstruct the flow of the glass, I provide means for removing these small lumps at the bottom of the shaft. To this end, a sliding gate 21 is provided to permit dumping of the small lumps as occasion may require. This removed material may again be placed into the top of the stack.

As the molten glass moves downwardly along the surfaces of the filter bed lumps, it will erode silica or alumina therefrom only to the extent of perhaps .5% to 1½% of the glass tonnage. The primary purpose of this filter-like bed of silica or other refractory lumps 16 is to effect plaining or refining of the glass, so that when it reaches the forward end of the forehearth, it will be ready for use. The molten glass from the chamber 9 will flow and spread throughout the mass of lumps, commencing above the upper baffles 19, and during its spreading and flowing movement to the bottom of the shaft, while subjected to the heating gases, will be refined or plained.

The glass in flowing down through the shaft will be split or divided into many streams which will coalesce below the various lumps, thereby effecting a stirring or mixing action. There is no intermingling of a refined portion of glass with a less refined glass such as occurs with plaining operations in conventional tanks. The glass does not completely fill the spaces between the lumps, and the gases are maintained in close contact with the glass, thereby providing maximum effective radiation from the heating flames. The forehearth 22 is maintained at required temperatures by suitable burners 24.

As above stated, the gases which pass from the stack 12 into the melting chamber 9 are thereby utilized to assist in melting the briquette batch. These gases when exhausted from the chamber 9 are used also to preheat the air for the burners 10 and thereafter to preheat the briquettes in the hopper 4, as hereinafter explained.

The gases from the chamber 9 are directed into the upper ends of passageways 26 that discharge into heat exchangers 27. These heat exchangers contain tubes 28 through which the gases pass to headers 29 and thence through passageways 30 and 31, and into opposite sides of the hopper 4, at 32. The gases pass through the briquettes in the hopper and out through a stack 33. Other forms of heat exchangers, such as regenerators could be used.

The gases as they enter the hopper should not be more than 1000° F. to 1200° F., since if the briquettes are heated to more than 900° F., they may fuse or soften and therefore cannot so conveniently be fed into the melting chamber 9. In case the gases in the passageways 31 are too hot, they can be diluted and cooled by atmospheric air introduced by damper control inlets 34. The gas inlets 32 are placed somewhat above the bottom of the hopper 4, so that if the briquettes tend to fuse and stick somewhat at those points, there need be no interference with the operation of the feeding plunger 8 and danger of clogging will be reduced. If the briquettes should accidentally happen to become overheated, they will tend to bridge in the hopper 4, but this bridge can be broken by opening a lid 35 and poking a rod into the hopper.

Referring again to the heat exchangers 27, they are placed above air inlets 37, the air that is drawn through these openings 37 passing around the heat exchange tubes 28 and upwardly through passageways 38 to thereby supply heated air for the burners 10, thus still further economizing through the use of heat that would otherwise be wasted.

If desired, the heat exchanger 27 could be utilized to heat air for the burners at 18, as shown in my second-named application, or to heat air for the burners 24.

In previous methods commonly employed, the B. t. u. requirement is much greater, since there is greater loss in heat radiation than by my method.

In conventional practice, all of the work of melting and refining the batch is performed in one tank that corresponds to my tank 9, and the waste gases from heat exchangers employed with these prior furnaces are partly utilized to heat the air for combustion and the rest wasted to the atmosphere. In my arrangement, I utilize gases that would otherwise be wasted to the atmosphere to preheat the briquettes.

Some other important advantages of my process resides in the fact that my chamber 9 need be only about one-half the size of the melting chamber of a standard tank, because approximately 25% of the heating is done on the briquettes, and the plaining is done rapidly and efficiently in a separate stack furnace wherein the ratio of heat receiving area by the glass to heat radiating surface of the furnace wall is perhaps 30 to 40 times that of the standard refining tank furnace. In the standard tank, there is about five times as much heat radiation per square foot below the glass level or melting line as from that portion above the glass level, because the body of glass is in intimate contact with the sides and bottom of the tank. In my stack arrangement, there is but a negligible percentage of the glass comes in contact with the walls of the stack.

I claim as my invention:

1. The method of melting and refining glass, which comprises melting briquettes of glass batch materials, passing the molten materials in a generally downward direction through a body of loosely arranged lumps that are more refractory than the briquettes, while moving a stream of heated gases upwardly between the said lumps, the said gases being of substantially higher temperature than that at which the molten batch materials were introduced into the body of lumps, and forming a pool of the molten glass at a zone removed from said lumps.

2. The method which comprises heating briquettes of glass batch materials to a temperature below their fusing point, moving the heated briquettes into a melting tank, passing the molten materials in a generally downward direction through a body of loosely arranged lumps that are more refractory than the briquettes, while moving a stream of heated gases upwardly between the said lumps, the said gases being of substantially higher temperature than that at which the molten batch materials were introduced into the body of lumps, and forming a pool of the molten glass at a zone removed from said lumps.

3. The method of melting and refining glass, which comprises melting glass batch materials, passing the molten materials in a generally downward direction through a body of loosely arranged lumps of material more highly refractory than the batch and which are heated to a sufficiently incandescent state to refine and plain the glass, and forming a pool of the refined glass.

4. The method of glass melting and refining, which comprises the steps of heating briquettes of glass-making materials in a chamber, discharging the heated briquettes into a tank furnace and melting them therein, discharging the molten material into a trough while maintaining the molten glass in the tank at a higher level than the stream through the trough, passing the glass from the trough into a shaft that supports a column of coarse lumps that are more highly refractory than the briquette materials, and heating the lumps to a sufficiently incandescent state to refine and plain the glass as it flows over and past the lumps.

5. The method of glass melting and refining, which comprises the steps of heating briquettes of glass-making materials in a chamber, discharging the heated briquettes into a tank furnace and melting them therein, discharging the molten material into a shaft that supports a column of coarse lumps that are more highly refractory than the briquette materials, and heating the lumps to a sufficiently incandescent state to refine and plain the glass as it flows over and past the lumps, by gases passed upwardly through the shaft, passing the gases through the tank and directing a portion thereof into the briquette chamber and also using the gases to preheat air for combustion of gases for melting.

6. The method of melting and refining glass, which comprises melting glass batch materials to form a pool, and directing the molten materials through a shaft that contains loosely arranged lumps of material that is more refractory than the batch materials, while heating said lumps to a sufficiently incandescent state to refine and plain the glass, by passing heating gases through the shaft, the flow of molten batch being so controlled as not to prevent flow of the gases past the lumps.

GEORGE E. HOWARD.

REFERENCES CITED

The following references are of record in the file of this patent:

UNITED STATES PATENTS

| Number | Name | Date |
|---|---|---|
| Re. 20,823 | Powell (I) | Aug. 16, 1938 |
| 1,600,484 | Owens | Sept. 21, 1926 |
| 1,610,376 | Hitner | Dec. 14, 1926 |
| 1,877,714 | Bulask | Sept. 13, 1932 |
| 2,190,271 | Powell (II) | Feb. 13, 1940 |
| 2,268,546 | Forter | Jan. 6, 1942 |
| 2,294,373 | Batchell | Sept. 1, 1942 |
| 2,508,629 | Tanberg | May 23, 1950 |

FOREIGN PATENTS

| Number | Country | Date |
|---|---|---|
| 486,447 | Germany | Nov. 25, 1929 |